Nov. 25, 1952  W. G. HENDRICKSON  2,619,412
NITROGEN FIXATION FURNACE
Filed Jan. 31, 1949  3 Sheets-Sheet 1
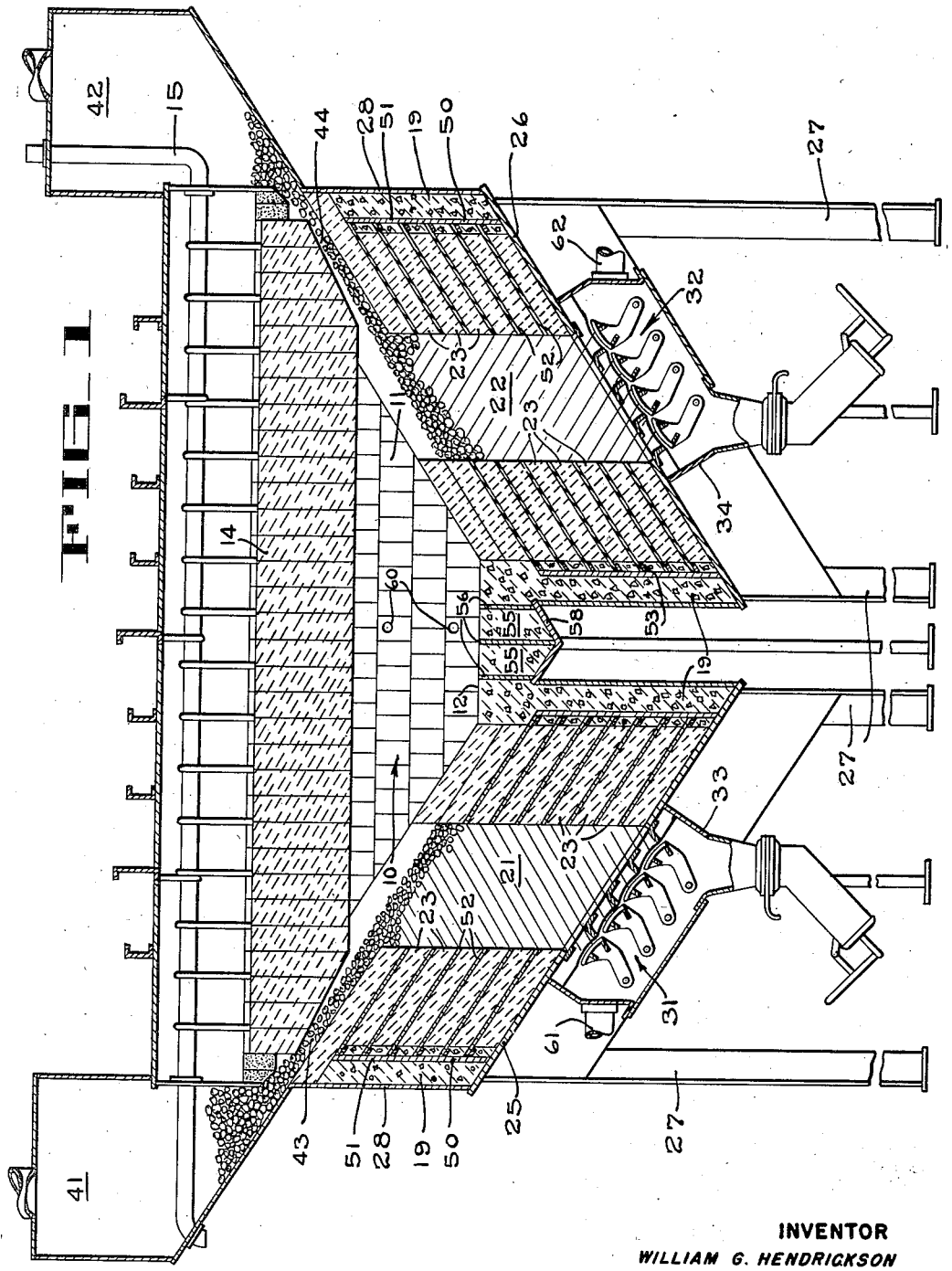
INVENTOR
WILLIAM G. HENDRICKSON
BY Nov. 25, 1952 W. G. HENDRICKSON 2,619,412
NITROGEN FIXATION FURNACE
Filed Jan. 31, 1949 3 Sheets-Sheet 2
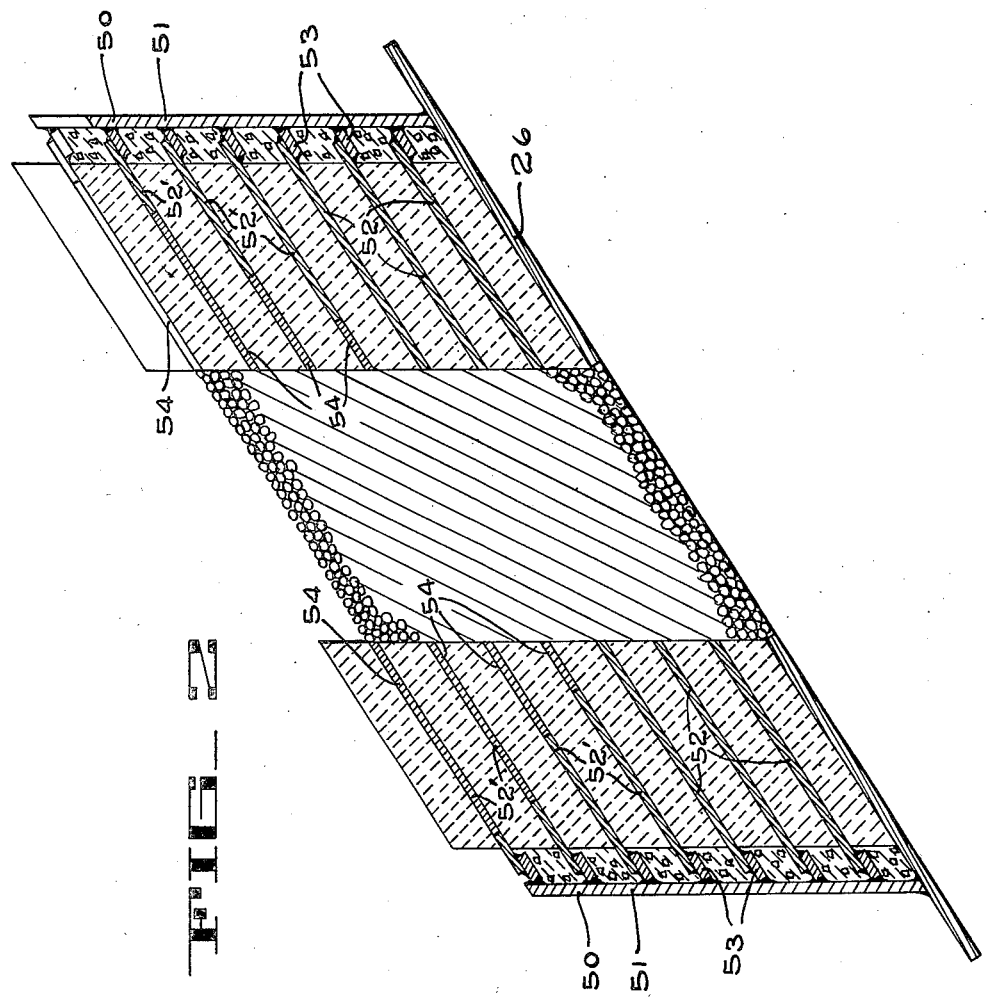
INVENTOR
WILLIAM G. HENDRICKSON
BY Nov. 25, 1952 W. G. HENDRICKSON 2,619,412
NITROGEN FIXATION FURNACE
Filed Jan. 31, 1949 3 Sheets-Sheet 3
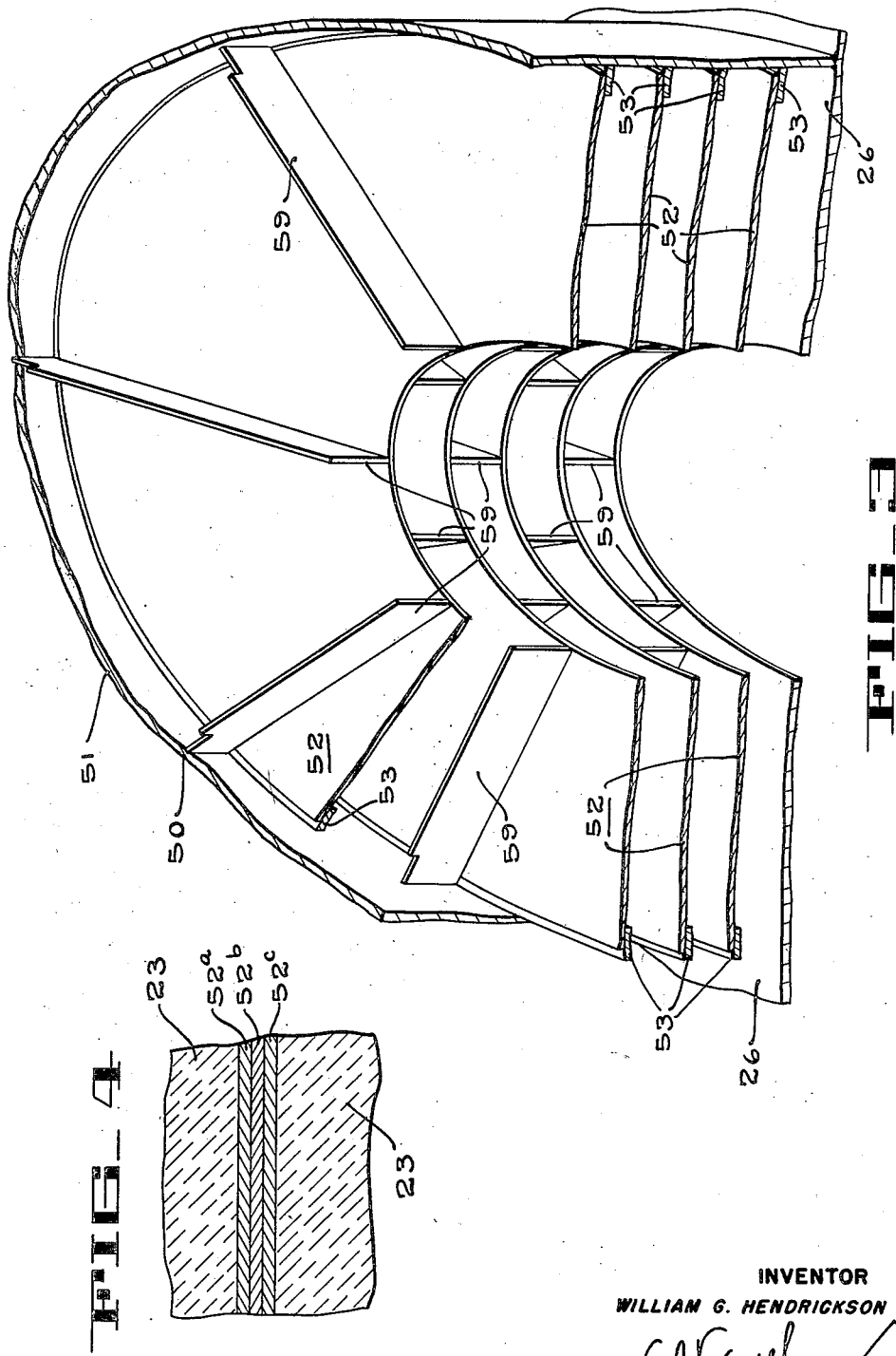
INVENTOR
WILLIAM G. HENDRICKSON
BY

UNITED STATES PATENT OFFICE 2,619,412

NITROGEN FIXATION FURNACE

William G. Hendrickson, San Jose, Calif., assignor to Wisconsin Alumni Research Foundation, a corporation of Wisconsin Application January 31, 1949, Serial No. 73,806

6 Claims. (Cl. 23—277)

The present invention relates to furnaces of the type exhibiting a significant pressure drop in the direction in which they are operated, such as regenerative furnaces of the checker-brick or pebble-bed type. In such furnaces, the entrant air supply and the effluent combustion gases must negotiate a multitude of channels formed by checker-brick structures or beds of refractory pebbles at either side of the combustion zone, in order that said gases may transmit their heat to said bricks or pebbles which in turn pass it on to the entrant air supply as soon as the direction of the process is reversed. Therefore, by periodically reversing the direction of the process, much of the heat that would otherwise be allowed to escape with the exiting reaction gases, is conserved so that heat losses are kept at a minimum.

Owing to the ability of such furnaces to establish and maintain very high temperatures with a minimum expenditure in fuel, they are widely used in industrial processes, involving reactions that require very high temperatures. Thus, regenerative furnaces of the pebble-bed type are employed in processes for the manufacture of nitrogen oxides from the atmosphere, which require temperatures of the order of 200° C., and wherein the reaction gases of the processes must be rapidly chilled to prevent decomposition of the nitric oxide yield contained therein, said chilling being automatically effected by the continual passage of the effluent reaction gases through a pebble bed that was chilled by the entrance of fresh air during the directly preceding half-cycle in the operation of the furnace.

Furnace of the types referred to are usually constructed from refractory bricks that are fitted together without mortar or with only a minimum of mortar, since mortar deteriorates quickly at the high temperatures developed in such furnaces. When these furnaces are operated in practice, the joints between the individual bricks separate and increase in width, due to shrinkage of the refractory material when first exposed to said high temperatures, and also due to inequalities in the expansion and contraction of said refractory materials as the temperature in said furnace varies; furthermore, the described occurrences produce usually cracks in and through the bricks themselves, no matter what the quality of the refractory material may be. These cracks in the bricks and the opening joints between said bricks establish paths along which air may avoid the particular process maintained in the furnace, and they are especially harmful in the walls of chambers that accommodate pebble beds or checker bricks because the paths established by said cracks and joints may permit large portions of the entrant air and the effluent gases to by-pass part or all of the channels formed by the pebbles or checker bricks, and thus avoid the preheating or chilling effect thereof. Said shunt paths may, in fact, be so extensive that part of the entrant air may pass directly from the entrance of one of the pebble beds or checker brick regenerators to the exit of the other and thus completely avoid participation in the process maintained in the combustion zone of the furnace. Whenever part of the air arrives at the combustion zone without being properly preheated, the temperature in said zone will drop. In the case of a process for the thermal fixation of atmospheric nitrogen this results in a rapid decrease of the amounts of nitric oxide formed in the combustion zone; and whenever part of the reaction gases are allowed to escape without proper chilling, the nitric oxide actually formed in the combustion zone is permitted to decompose resulting in a further decline of productivity. Air which totally by-passes the combustion zone, participates at no time in the nitrogen fixation process and is, therefore, a total loss. In the furnaces at present employed in the manufacture of nitrogen oxides, the deterioration in productivity resulting from leakage of air and/or reaction gases through crack formations in the walls of the furnace, and especially in the walls of the pebble beds, is frequently so serious as to make it impossible to exploit the process on a commercial basis. Thus, it has been observed that installations initially capable of yielding quantities of the order of 1.5% nitrogen oxides in the stack gases deteriorated within a short time to give yields of less than ½% due to crack formations in the walls of the furnace.

It is an object of the present invention to maintain the operating efficiency of furnaces and particularly of regenerative furnaces, of the type referred to, at high levels of productivity in spite of crack formations in the refractory walls thereof.

More specifically, it is an object of the present invention to provide means, in regenerative furnaces of the type referred to, for effectively limiting the tendency of entrant air of exiting reaction gases to by-pass portions of their normal path through cracks formed in the wall of said furnaces.

It is another object of the present invention to provide a furnace construction composed of layers of refractory bricks, which is adapted to restrict leakage of entrant air or exiting reaction gases through cracks in the refractory walls thereof, to a distance equal to the depth of a single layer of bricks.

Additionally, it is an object of the present invention to provide a regenerative furnace structure composed of layers of refractory bricks and equipped with checker-brick or pebble-bed regenerators, wherein the tendency of entrant air and effluent reaction gases to by-pass said regenerators is restricted to the depth of a predetermined number of said layers.

It is a specific object of the present invention to so arrange a nitrogen-fixation furnace, of the pebble-bed type, as to effectively limit the tendency of the entrant air supply to by-pass the preheating effect of its pebble beds, and thus maintain the productivity of the process progressing in said furnace at high levels.

It is another specific object of the present invention to so arrange a nitrogen-fixation furnace of the pebble-bed type, as to effectively limit the tendency of the effluent reaction gases to by-pass the chilling effect of its pebble beds, and thus secure high recoveries of the nitric oxide formed in its combustion zone over extended periods of operation.

Furthermore, it is an object of the present invention to provide a composite metallic and refractory passage structure, for furnaces of the type referred to, wherein the metal component is arranged to effectively limit the extent of shunt paths that may be formed in the refractory component, in a manner adapted to preserve its effectiveness even at such exceedingly high temperatures as are developed in nitrogen-fixation furnaces.

These and other objects of my invention will be apparent from the following description of the accompanying drawings which illustrate certain preferred embodiments thereof, and wherein:

Figure 1 is a sectional elevation of a regenerative furnace of the pebble-bed type constructed in accordance with my invention;

Figure 2 is a vertical section through the right pebble bed of the furnace shown in Figure 1, drawn on an enlarged scale as compared with said Figure 1;

Figure 3 is a fragmentary perspective, partly in section, of one of the components of a pebble bed structure; and Figure 4 is a vertical section, through part of the wall of a pebble bed, illustrating a modified embodiment of my invention.

In accordance with my invention, I subdivide the refractory structure of a furnace into a plurality of strata or layers superposed in the direction in which the entrant air supply and the effluent combustion gases traverse said furnace, and I arrange each layer in inwardly open cells or compartments formed by superposed metallic partitioning walls extending inwardly from an outer metallic shell which encases the exterior of the refractory structure. In this manner, cracks or crevices formed in the refractory furnace structure are unable to conduct air or reaction gases to substantially different pressure levels and the by-passing of pebble beds or checker-brick structures may be restricted to such small distances as will have no appreciable effect upon the performance of the furnace, such as the depth of a single one of the bricks from which the furnace is made.

The furnace illustrated in the accompanying drawings is a regenerative furnace of the pebble-bed type, such as may be used for the production of nitrogen oxides from air by direct combination of nitrogen and oxygen under temperatures of the order of 2000° C. Having reference to Figure 1, said furnace comprises a combustion chamber 10 of predominantly horizontal compass formed between parallel walls of refractory bricks or blocks, only the rear wall 11 being visible in the figure. Said combustion zone has a horizontal floor 12 made from a suitable refractory material, such as rammed periclase and is covered by a flat roof 14 formed by rows of refractory tiles or bricks, suitably suspended from a metallic overhead structure, such as a number of horizontal beams 15, which may be of tubular construction to permit circulation of a cooling fluid therein. At its opposite ends the combustion chamber 10 communicates with a pair of substantially vertically ascending passages or antechambers 21 and 22 constructed from vertically superposed annular layers 23 of refractory brick. Said layers 23 may be arranged to slant downwardly in the direction of the furnace center, and they rest upon equally slanting metallic base plates 25 and 26, respectively, which are supported upon suitable uprights 27 and form the bottom of a steel jacket 28 that encases the entire refractory furnace structure, as shown. The jacket 28 is spaced in a horizontal direction from the adjacent outer surfaces of said refractory furnace structure to accommodate a suitable packing of insulating material 19.

The bottom ends of the antechambers 21 and 22 are closed off by suitable dumping grates 31 and 32, respectively, which are encased in steel hoppers 33 and 34 that are supported from the base plates 25 and 26. The antechambers 21, 22 are filled with refractory pebbles to form pebble beds which must be traversed by the entrant air and the effluent reaction gases during the operation of the furnace. Said pebbles are preferably of spherical, spheroidal or cylindrical shape averaging from ½" to 1" in diameter, and they are constructed from high-grade refractory materials, such as dense magnesium oxide or stabilized zirconium oxide. In the particular furnace illustrated in the accompanying drawings, said pebbles are delivered into the chambers 21 and 22 from elevated steel reservoirs 41 and 42 disposed exteriorly of, and at opposite sides of the furnace structure, which communicate with said chambers 21 or 22, respectively, through narrow slanting feed channels 43 and 44, respectively, that are cut through the furnace structure and empty into the upper ends of the chambers 21 and 22 at points remote from the combustion zone. The pebble beds formed by the stream of pebbles descending from said reservoirs into the chambers 21 and 22 through said supply channels 43 and 44 exhibit inclined upper surfaces which face the intermediately positioned combustion chamber 10, as shown in Figure 1.

In addition to the refractory structure just described, the walls of each of the pebble bed chambers 21 and 22 comprise a metallic structure 50, which is composed of a shell 51 that is slightly spaced from the outer surfaces of the brick layers, as shown in Figure 1, and which is provided with a plurality of inwardly directed, vertically superposed partitioning shelves or baffle plates 52 that extend between each two superposed brick layers 23 and terminate about flush with the inner surfaces thereof. The outer shell 51 of the metal structure 50 is of sufficient thickness to form a sturdy self-supporting wall, that may be welded directly upon the base plates 25 and 26, of the all-encasing steel jacket 28. The baffles 52, however, are preferably formed by metal sheets of such thinness that they will readily conform to the surfaces of the brick layers, and thus will fill and seal the joints between adjacent layers, so that none of the extremely hot reaction gases sweeping through the chambers 21 or 22 may penetrate along said joints to the outer shell 51. In a practical embodiment of my invention the thickness of the outer shell may be of the order of $1/8''$, while the thickness of the shelves or baffles may only be about $1/20''$. To properly attach such thin sheets of metal to the inner cylindrical surface of the steel shell 51, it may be necessary to first weld annular flanges 53 of greater thickness than said shelves to the inner wall of the shell, and then weld the outer edges of the shelves upon the upper ledges thus formed, as shown in Figures 2 and 3.

The metallic structure 50 of the pebble bed walls may be made from any suitable metal or metal alloy that has a high melting point and will resist oxidization, and under ordinary circumstances may be made from stainless steel. However, in case of furnaces that operate at extremely high temperatures, such as the furnaces used in the thermal process for the fixation of atmospheric nitrogen, I have found it advantageous to construct the various components of the structure 50 from different materials depending upon their proximity relative to the combustion zone. Thus, the outer shell 51, which is relatively removed from the heat of the combustion zone, may be made from stainless steel, and some of the lower shelves or baffles 52 may likewise be made from stainless steel since they are located at the outer ends of the pebble beds that are always kept relatively cool. In furnaces for the thermal fixation of nitrogen it is inadvisable, however, to employ sheets of stainless steel in the middle and higher regions of the pebble-bed walls where said baffles may conceivably become so hot as to oxidize rapidly, because iron oxides react harmfully with the refractory materials from which the bricks are made, in that they lower their melting point which may result in melting of the refractory materials or may cause them to swell to an appreciable extent so that considerable expansional and warping strains are exerted upon the wall structure of the pebble-beds. Therefore, wherever there is a possibility that the baffles may oxidize rapidly, a heat-resistant metal should be employed that is less harmful to refractories in oxidized condition than stainless steel, such as for instance an alloy known under the name of Inconel which is composed of approximately 80% of nickel, 13% of chromium and only about 7% of iron. As regards the uppermost baffles, however, which are exposed to such temperatures that they are bound to oxidize and melt, the presence of iron—even in such small portions as contained in Inconel—may be detrimental and, in constructing furnaces for the thermal fixation of nitrogen in accordance with my invention, the inner edges of these uppermost baffles are preferably made from separate annular sheets of a metal that contains no iron and is in no way harmful to the refractories employed, such as practically pure nickel. When nickel is subjected to such high temperatures that it melts, it oxidizes quickly and the resultant nickel oxide blends with the magnesium oxide, from which the refractory bricks are usually made, into a solid solution that fuses the superposed brick layers together and forms a practically impenetrable partition between said layers. Figure 2 illustrates such a composite metal structure, wherein the outer shell 51 may be made from stainless steel, while the baffles 52 are made from Inconel with the inner edges of the four uppermost baffles 52' formed by annular gaskets 54 of practically pure nickel, that increase in radial width in the direction of the combustion zone along a particular isotherm of heat penetration beyond which the Inconel is not likely to oxidize or melt.

Further, in case of appreciable differential strains between the superposed brick layers, it may be of advantage to place a plurality of very thin metal sheets, rather than a single sheet, between each two adjacent brick layers to avoid rupture of the partitions 52 during operation of the furnace, because said partitioning shelves tend to adhere to the adjacent refractory surfaces and thus may be subjected to destructive differential strains as their adjacent brick layers expand or contract in different directions or to different degrees; but by employing a plurality of thin sheets, instead of a single sheet, for instance: three such sheets 52a, b and c, as shown in Figure 4, the outer sheets 52a and c are free to follow the movements of the brick layers to which they adhere, while the center sheet 52b remains unaffected and will, therefore, be left intact and continue to effectively separate the brick layers, even if the outer sheets should break.

Reverting to Figure 1, it should be noted that the floor 12 of the combustion chamber 10 may likewise be subdivided into a plurality of separate layers 55 by vertical baffles 56 which may be of the same or a similar construction as the baffles 52, and which may be welded upon a reinforced bottom portion 58 of the steel jacket 28. Furthermore, the metal structures 50 of the pebble bed walls may comprise vertical partitioning walls 59, arranged at angular intervals within the compartments formed between the partitioning shelves 52, to sub-divide said compartments into a plurality of separate sectors of limited angular width, as shown in Figure 3. Said vertical partitioning walls 59 should extend radially all the way to the outer shell 51 and should preferably be welded to said shell, to effectively limit circulation of air or reaction gases within the individual compartments to the compass of a single one of said sectors.

In practical operation, fuel is supplied to the combustion chamber 10 of the described furnace through suitable nozzles, indicated at 60 in Figure 1, and air is alternately delivered to the combustion zone through one or the other of the pebble beds 21, 22. For instance, if at a particular moment in the operation of the furnace the pebble bed 21 is hot while the pebble bed 22 is relatively cool, a blast of air from a blower (not shown) is directed through a conduit 61 into the hopper 33 and enters the pebble bed 21 through the grate 31. As the air travels through the tortuous channels formed by the pebble bed 21, it rapidly absorbs heat from the pebbles and arrives at the combustion zone in a heated condition, enabling the development of higher temperatures in said combustion zone than ordinarily attainable with the fuel employed in the operation of the furnace. The reaction gases of the combustion process traverse the cool pebble bed 22 where they are rapidly chilled, and pass through the grate 32 into the hopper 34, from where a conduit 62 may conduct them to a further processing station, such as, for instance, a nitrogen-oxide recovery system (not shown). After an interval of time proportioned to prevent an undue rise in the temperature of the gases discharged from the bottom of the pebble bed 22, the operation of the furnace is reversed by manipulating a suitable reversing valve (not shown) to direct the supply of air through conduit 62, instead of conduit 61, so that it may now be forewarmed in the newly heated pebble bed 22, while the hot reaction gases are chilled by passage through the pebble bed 21 and escape through the conduit 61. As the process is continued by periodic reversals in the direction of operation of the furnace, the joints in the brick structure will separate and increase in width and cracks will usually form in the bricks under the intense heat of the combustion, and also due to differential strains set up by inequalities in the expansion and contraction of said bricks, as they are alternately swept by the relatively cool supply of fresh air and the extremely hot combustion gases. However, owing to the metal structure provided intermediately to and rearwardly of the individual layers of the pebble-bed walls, as provided for in accordance with my invention, the shunt paths formed by said cracks are limited in effective length to the depth of a single brick layer, so that air or reaction gases entering said cracks are confined to the narrow compartments formed between the baffles 52. Here they may stagnate and thus prevent further influx of air or gases or they may return to the pebble beds, having by-passed said pebble beds to a distance no greater than the depth of a single one of the compartments, which has no appreciable effect upon the performance of the process maintained in the furnace. Furthermore, due to the presence of the baffles 56 in the floor 12 of the combustion zone, it is impossible for air that has traversed a preheating bed to avoid the combustion zone by leaking through cracks in said floor directly to the oppositely positioned chilling bed. Hence, even after prolonged operation of the furnace when the joints between the bricks have separated and numerous cracks may have developed in said bricks, substantially all the air supplied to the furnace is forced to negotiate practically the full length of the tortuous channels of whatever pebble bed may serve as preheater at a particular moment and will thus derive full benefit from said beds. Said air is then constrained to pass through the combustion zone of the furnace so as to participate fully in the formation of nitric oxides; and all the gases leaving the combustion zone are forced to negotiate the opposite pebble bed over practically its total depth to transmit their heat to said bed to the fullest extent and thus effectively stabilize practically all the nitric oxide formed in the combustion zone. Hence, the furnace is maintained at peak performance in regard to conservation of heat, ability to develop high temperatures and chilling efficiency; the process may therefore be continued under conditions of maximum productivity over extended periods of time.

While I have described my invention with the aid of a particular embodiment thereof, it will be understood that I do not wish to be limited to the particular constructional details illustrated and described, which may be departed from without departing from the spirit and scope of my invention. For instance, the described partitioning shelves may be spaced sufficiently far apart to accommodate more than a single layer of bricks, and the metal components of the described furnace structure may be constructed from heat-resisting metals or metal alloys other than those specifically mentioned. Furthermore, the roof of the furnace may be arranged in similar metallic partitioning cells as the walls of the pebble beds and the floor of the combustion zone. Also, my invention is not limited in its utility to furnaces of the pebble-bed or checker-brick type, but will yield beneficial results in all furnace constructions exhibiting appreciable pressure differentials in the direction in which the furnace is operated.

Having thus described my invention and the manner in which it is to be performed, what I claim is:

1. A regenerative furnace especially for the thermal fixation of nitrogen comprising a combustion chamber of refractory material; a pair of passages leading into said combustion chamber to conduct air into and discharge the combustion gases out of said combustion chamber, the wall of each of said passages comprising an outer shell of a heat resisting metal, a plurality of partitions of a heat resisting metal disposed within said shell in planes transverse to the direction of the gas flow through the passage, to form a plurality of inwardly open compartments, and layers of a refractory material disposed within said compartments in circumferential relationship around said passage, said partitions extending from said outer shell substantially to the inner surfaces of said refractory layers and having inner edge portions of substantially pure nickel; and heat regenerative bodies, such as refractory pebbles, disposed within said passages.

2. Arrangement according to claim 1 wherein said refractory material is magnesium oxide.

3. Arrangement according to claim 1 wherein the said inner edge portions of successive partitions increase in radial width in the direction of said combustion chamber.

4. A regenerative furnace especially for the thermal fixation of nitrogen comprising a combustion chamber of refractory material; a pair of passages leading into said combustion chamber to conduct air into and discharge the combustion gases out of said combustion chamber, the wall of each of said passages comprising an outer shell of a heat resisting metal, a plurality of partitions of a heat resisting metal disposed within said shell in planes transverse to the direction of the gas flow through the passage to form a plurality of inwardly open compartments superposed in the direction of said combustion chamber, and layers of a refractory material disposed within said compartments in circumferential relationship around the passage, said partitions extending from said outer shell substantially to the inner surfaces of said refractory layers, and heat regenerative bodies, such as refractory pebbles, disposed within said passages.

5. A regenerative furnace especially for the thermal fixation of nitrogen, comprising a combustion chamber of refractory material; a pair of passages leading into said combustion chamber to conduct air into and discharge the combustion gases out of said combustion chamber, the wall of each of said passages comprising an outer shell of a heat resisting metal, a plurality of partitions disposed within said shell in planes transverse to the direction of the gas flow through said passage to form a plurality of inwardly open compartments superposed in the direction of said combustion chamber, said partitions being formed by a plurality of thin sheets of a heat resisting metal, and layers of a refractory material disposed within said compartments in circumferential relationship around the passage said partitions extending from said outer shell substantially to the inner surfaces of said refractory layers; and heat regenerative bodies, such as refractory pebbles, disposed within said passages.

6. A regenerative furnace, especially for the thermal fixation of nitrogen, comprising a combustion chamber; a pair of passages leading into said combustion chamber to conduct air into and discharge the combustion gases out of said combustion chamber, the wall of each of said passages comprising an outer shell of a heat resisting metal, a plurality of first partitions of a heat resisting metal disposed within said shell in planes transverse to the direction of the gas flow through said passage to form a plurality of inwardly open compartments superposed in the direction of said combustion chamber, second partitions of a heat resisting metal arranged to subdivide said compartments into separate sectors, and layers of a refractory material disposed within said compartment sectors in circumferential relationship around the passage, said first partitions extending from said outer shell substantially to the inner surfaces of said refractory layers, and heat regenerative bodies, such as refractory pebbles, disposed within said passages.

WILLIAM G. HENDRICKSON.

REFERENCES CITED

The following references are of record in the file of this patent:

UNITED STATES PATENTS

| Number | Name | Date |
|---|---|---|
| 237,339 | Thompson | Feb. 1, 1881 |
| 1,079,151 | Smallwood | Nov. 18, 1913 |
| 1,569,197 | Maccallum | Jan. 12, 1916 |
| 1,307,362 | Kaufman | June 24, 1919 |
| 2,154,813 | Heuer | Apr. 18, 1939 |
| 2,230,141 | Heuer | Jan. 28, 1941 |
| 2,416,490 | Molique | Feb. 25, 1947 |
| 2,417,049 | Bailey et al. | Mar. 11, 1947 |
| 2,512,259 | Pike | June 20, 1950 |